United States Patent
Vukadinovic et al.

(10) Patent No.: US 11,973,848 B2
(45) Date of Patent: Apr. 30, 2024

(54) APPARATUS, METHOD AND COMPUTER PROGRAM

(71) Applicant: NOKIA TECHNOLOGIES OY, Espoo (FI)

(72) Inventors: Vladimir Vukadinovic, Wroclaw (PL); Fernando Sanchez Moya, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 59 days.

(21) Appl. No.: 17/788,039

(22) PCT Filed: Jan. 7, 2020

(86) PCT No.: PCT/FI2020/050010
§ 371 (c)(1),
(2) Date: Jun. 22, 2022

(87) PCT Pub. No.: WO2021/140267
PCT Pub. Date: Jul. 15, 2021

(65) Prior Publication Data
US 2023/0034755 A1   Feb. 2, 2023

(51) Int. Cl.
*H04L 67/61* (2022.01)
*H04W 28/02* (2009.01)

(52) U.S. Cl.
CPC ......... *H04L 67/61* (2022.05); *H04W 28/0268* (2013.01)

(58) Field of Classification Search
CPC .............. H04L 67/61; H04W 28/0268; H04W 84/005; H04W 28/18; H04W 84/18; H04W 4/44
See application file for complete search history.

(56) References Cited

U.S. PATENT DOCUMENTS

2017/0288886 A1   10/2017   Atarius et al.
2018/0049193 A1*   2/2018   Belleschi .......... H04W 72/0446
(Continued)

OTHER PUBLICATIONS

3rd Generation Partnership Project; Technical Specification Group Services and System Aspects; Study on application layer support for V2X services; (Release 16) (Year: 2018).*
(Continued)

*Primary Examiner* — Nicholas R Taylor
*Assistant Examiner* — Tania M Pena-Santana
(74) *Attorney, Agent, or Firm* — Barta Jones, PLLC

(57) ABSTRACT

There is provided an apparatus, said apparatus comprising means for providing a request to an application client from a server for the application, or receiving a request from the application client at the server, for uplink transmission of cooperative awareness messages from the application client to a network, determining requirements associated with the application for cooperative awareness messages, based on the requirements, providing a request from the server to the network for resources and QoS parameters for uplink transmission of the cooperative awareness messages from the application client to the network, receiving at the server an indication of the availability of resources from the network; determining, based on the application requirements and the availability of resources, criteria for use in determining which of the cooperative awareness messages to provide to the network and providing the criteria to the application client from the server.

10 Claims, 7 Drawing Sheets

(56) References Cited

U.S. PATENT DOCUMENTS

| | | | |
|---|---|---|---|
| 2018/0124656 A1* | 5/2018 | Park | H04W 36/0072 |
| 2018/0132208 A1 | 5/2018 | Pan et al. | |
| 2019/0124015 A1* | 4/2019 | Loehr | H04L 5/0058 |
| 2022/0353732 A1* | 11/2022 | Filippou | H04W 28/0289 |
| 2022/0388505 A1* | 12/2022 | Sharma Banjade | G08G 1/164 |
| 2022/0394784 A1* | 12/2022 | Hwang | H04W 76/10 |

OTHER PUBLICATIONS

3rd Generation Partnership Project; Technical Specification Group Services and System Aspects; Study on application layer support for V2X services; (Release 16)), hereinafter '3GPP', which describes V2X services over 3GPP systems (Year: 2018).*

3GPP (Year: 2018).*

3GPP TS 23.502 V15.8.0 (Dec. 2019), Technical Specification, 3rd Generation Partnership Project; Technical Specification Group Services and System Aspects; Procedures for the 5G System (5GS); Stage 2 (Release 15), Dec. 2019.

International Search Report and Written Opinion dated May 14, 2020 corresponding to International Patent Application No. PCT/FI2020/050010.

3GPP TS 22.185 V15.0.0 (Jun. 2018), Technical Specification, 3rd Generation Partnership Project; Technical Specification Group Services and System Aspects; Service requirements for V2X services; Stage 1 (Release 15), Jun. 2018.

3GPP TS 23.287 V16.1.0 (Dec. 2019), Technical Specification, 3rd Generation Partnership Project; Technical Specification Group Services and System Aspects; Architecture enhancements for 5G System (5GS) to support Vehicle-to-Everything (V2X) services (Release 16), Dec. 2019.

3GPP TS 23.434 V16.2.0 (Dec. 2019), Technical Specification, 3rd Generation Partnership Project; Technical Specification Group Services and System Aspects; Service Enabler Architecture Layer for Verticals (SEAL); Functional architecture and information flows; (Release 16), Dec. 2019.

3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019.

3GPP TR 23.795 V16.1.0 (Dec. 2018), Technical Report, 3rd Generation Partnership Project; Technical Specification Group Services and System Aspects; Study on application layer support for V2X services; (Release 16), Dec. 2018.

3GPP TS 23.286 V16.2.0 (Dec. 2019), Technical Specification, 3rd Generation Partnership Project; Technical Specification Group Services and System Aspects; Application layer support for Vehicle-to-Everything (V2X) services; Functional architecture and information flows; (Release 16), Dec. 2019.

Draft ETSI EN 302 637-2 V0.0.11 (Nov. 2012), European Standard, Intelligent Transport Systems (ITS); Vehicular Communications; Basic Set of Applications; Part 2: Specification of Cooperative Awareness Basic Service, ETSI, Nov. 16, 2012.

* cited by examiner

APPARATUS, METHOD AND COMPUTER PROGRAM

FIELD

The present application relates to a method, apparatus, system and computer program and in particular but not exclusively to transmission of Cooperative Intelligent Transportation Systems (C-ITS) cooperative awareness information in the uplink of a 3GPP radio access network (RAN).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for providing a request to an application client from a server for the application, or receiving a request from the application client at the server, for uplink transmission of cooperative awareness messages from the application client to a network, determining requirements associated with the application for cooperative awareness messages, based on the requirements, providing a request from the server to the network for resources and QoS parameters for uplink transmission of the cooperative awareness messages from the application client to the network, receiving at the server an indication of the availability of resources from the network, determining, based on the application requirements and the availability of resources, criteria for use in determining which of the cooperative awareness messages to provide to the network and providing the criteria to the application client from the server.

The apparatus may comprise means for receiving a traffic specification at the server from the application client and forwarding the specification to an application specific server.

The criteria may comprise rules for discarding of cooperative awareness message not to be provided to the network and marking of cooperative awareness messages to be provided to the network by a marker.

The marker may comprise at least one IPv4 type-of-service marker or at least one IPv6 traffic-class marker.

The cooperative awareness messages may be mapped to one or more quality of service, QoS, flow based on their markers.

Each cooperative awareness message may be associated with protocol control information.

The associated protocol control information may be for use in determining which of the cooperative awareness messages to provide to the network.

The requirements associated with the application for cooperative awareness messages may comprise at least one of latency and message priority.

The quality of service, QoS, parameters may comprise at least one of latency, throughput, and reliability.

In a second aspect, there is provided an apparatus comprising means for receiving a request at an application client from a server for the application, or providing a request from the application client to the server, for uplink transmission of cooperative awareness messages from the application client to a network and receiving criteria from the server, determined based on the application requirements and the availability of resources, for use in determining which of the cooperative awareness messages to provide to the network from the application client.

The apparatus may comprise means for providing a traffic specification to the server from the application client.

The criteria may comprise rules for discarding of cooperative awareness message not to be provided to the network and marking of cooperative awareness messages to be provided to the network by a marker.

The marker may comprise at least one IPv4 type-of-service marker or at least one IPv6 traffic-class marker.

The cooperative awareness messages are mapped to one or more quality of service, QoS, flow based on their markers.

Each cooperative awareness message may be associated with protocol control information.

The associated protocol control information may be for use in determining which of the cooperative awareness messages to provide to the network.

The requirements associated with the application for cooperative awareness messages may comprise at least one of latency and message priority.

The quality of service, QoS, parameters may comprise at least one of latency, throughput, and reliability.

In a third aspect, there is provided a method comprising providing a request to an application client from a server for the application, or receiving a request from the application client at the server, for uplink transmission of cooperative awareness messages from the application client to a network, determining requirements associated with the application for cooperative awareness messages, based on the requirements, providing a request from the server to the network for resources and QoS parameters for uplink transmission of the cooperative awareness messages from the application client to the network, receiving at the server an indication of the availability of resources from the network, determining, based on the application requirements and the availability of resources, criteria for use in determining which of the cooperative awareness messages to provide to the network and providing the criteria to the application client from the server.

The method may comprise means for receiving a traffic specification at the server from the application client and forwarding the specification to an application specific server.

The criteria may comprise rules for discarding of cooperative awareness message not to be provided to the network and marking of cooperative awareness messages to be provided to the network by a marker.

The marker may comprise at least one IPv4 type-of-service marker or at least one IPv6 traffic-class marker.

The cooperative awareness messages may be mapped to one or more quality of service, QoS, flow based on their markers.

Each cooperative awareness message may be associated with protocol control information.

The associated protocol control information may be for use in determining which of the cooperative awareness messages to provide to the network.

The requirements associated with the application for cooperative awareness messages may comprise at least one of latency and message priority.

The quality of service, QoS, parameters may comprise at least one of latency, throughput, and reliability.

In a fourth aspect there is provided a method comprising receiving a request at an application client from a server for the application, or providing a request from the application client to the server, for uplink transmission of cooperative awareness messages from the application client to a network and receiving criteria from the server, determined based on the application requirements and the availability of resources, for use in determining which of the cooperative awareness messages to provide to the network from the application client.

The method may comprise providing a traffic specification to the server from the application client.

The criteria may comprise rules for discarding of cooperative awareness message not to be provided to the network and marking of cooperative awareness messages to be provided to the network by a marker.

The marker may comprise at least one IPv4 type-of-service marker or at least one IPv6 traffic-class marker.

The cooperative awareness messages are mapped to one or more quality of service, QoS, flow based on their markers.

Each cooperative awareness message may be associated with protocol control information.

The associated protocol control information may be for use in determining which of the cooperative awareness messages to provide to the network.

The requirements associated with the application for cooperative awareness messages may comprise at least one of latency and message priority.

The quality of service, QoS, parameters may comprise at least one of latency, throughput, and reliability.

In a fifth aspect there is provided an apparatus comprising at least one processor and at least one memory including a computer program code, the at least one memory and computer program code configured to, with the at least one processor, cause the apparatus at least to: provide a request to an application client from a server for the application, or receive a request from the application client at the server, for uplink transmission of cooperative awareness messages from the application client to a network, determine requirements associated with the application for cooperative awareness messages, based on the requirements, provide a request from the server to the network for resources and QoS parameters for uplink transmission of the cooperative awareness messages from the application client to the network, receive at the server an indication of the availability of resources from the network, determine, based on the application requirements and the availability of resources, criteria for use in determining which of the cooperative awareness messages to provide to the network and provide the criteria to the application client from the server.

The apparatus may be configured to receive a traffic specification at the server from the application client and forwarding the specification to an application specific server.

The criteria may comprise rules for discarding of cooperative awareness message not to be provided to the network and marking of cooperative awareness messages to be provided to the network by a marker.

The marker may comprise at least one IPv4 type-of-service marker or at least one IPv6 traffic-class marker.

The cooperative awareness messages may be mapped to one or more quality of service, QoS, flow based on their markers.

Each cooperative awareness message may be associated with protocol control information.

The associated protocol control information may be for use in determining which of the cooperative awareness messages to provide to the network.

The requirements associated with the application for cooperative awareness messages may comprise at least one of latency and message priority.

The quality of service, QoS, parameters may comprise at least one of latency, throughput, and reliability.

In a sixth aspect there is provided an apparatus comprising: at least one processor and at least one memory including a computer program code, the at least one memory and computer program code configured to, with the at least one processor, cause the apparatus at least to: receive a request at an application client from a server for the application, or provide a request from the application client to the server, for uplink transmission of cooperative awareness messages from the application client to a network and receive criteria from the server, determined based on the application requirements and the availability of resources, for use in determining which of the cooperative awareness messages to provide to the network from the application client.

The apparatus may be configured to provide a traffic specification to the server from the application client.

The criteria may comprise rules for discarding of cooperative awareness message not to be provided to the network and marking of cooperative awareness messages to be provided to the network by a marker.

The marker may comprise at least one IPv4 type-of-service marker or at least one IPv6 traffic-class marker.

The cooperative awareness messages are mapped to one or more quality of service, QoS, flow based on their markers.

Each cooperative awareness message may be associated with protocol control information.

The associated protocol control information may be for use in determining which of the cooperative awareness messages to provide to the network.

The requirements associated with the application for cooperative awareness messages may comprise at least one of latency and message priority.

The quality of service, QoS, parameters may comprise at least one of latency, throughput, and reliability.

In a seventh aspect there is provided a computer readable medium comprising program instructions for causing an apparatus to perform at least the following providing a request to an application client from a server for the application, or receiving a request from the application client at the server, for uplink transmission of cooperative awareness messages from the application client to a network, determining requirements associated with the application for cooperative awareness messages, based on the requirements, providing a request from the server to the network for resources and QoS parameters for uplink transmission of the cooperative awareness messages from the application client to the network, receiving at the server an indication of the availability of resources from the network determining, based on the application requirements and the availability of resources, criteria for use in determining which of the cooperative awareness messages to provide to the network and providing the criteria to the application client from the server.

The apparatus may be caused to perform receiving a traffic specification at the server from the application client and forwarding the specification to an application specific server.

The criteria may comprise rules for discarding of cooperative awareness message not to be provided to the network and marking of cooperative awareness messages to be provided to the network by a marker.

The marker may comprise at least one IPv4 type-of-service marker or at least one IPv6 traffic-class marker.

The cooperative awareness messages may be mapped to one or more quality of service, QoS, flow based on their markers.

Each cooperative awareness message may be associated with protocol control information.

The associated protocol control information may be for use in determining which of the cooperative awareness messages to provide to the network.

The requirements associated with the application for cooperative awareness messages may comprise at least one of latency and message priority.

The quality of service, QoS, parameters may comprise at least one of latency, throughput, and reliability.

In an eighth aspect there is provided a computer readable medium comprising program instructions for causing an apparatus to perform at least the following receiving a request at an application client from a server for the application, or providing a request from the application client to the server, for uplink transmission of cooperative awareness messages from the application client to a network and receiving criteria from the server, determined based on the application requirements and the availability of resources, for use in determining which of the cooperative awareness messages to provide to the network from the application client.

The apparatus may be caused to perform providing a traffic specification to the server from the application client.

The criteria may comprise rules for discarding of cooperative awareness message not to be provided to the network and marking of cooperative awareness messages to be provided to the network by a marker.

The marker may comprise at least one IPv4 type-of-service marker or at least one IPv6 traffic-class marker.

The cooperative awareness messages are mapped to one or more quality of service, QoS, flow based on their markers.

Each cooperative awareness message may be associated with protocol control information.

The associated protocol control information may be for use in determining which of the cooperative awareness messages to provide to the network.

The requirements associated with the application for cooperative awareness messages may comprise at least one of latency and message priority.

The quality of service, QoS, parameters may comprise at least one of latency, throughput, and reliability.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
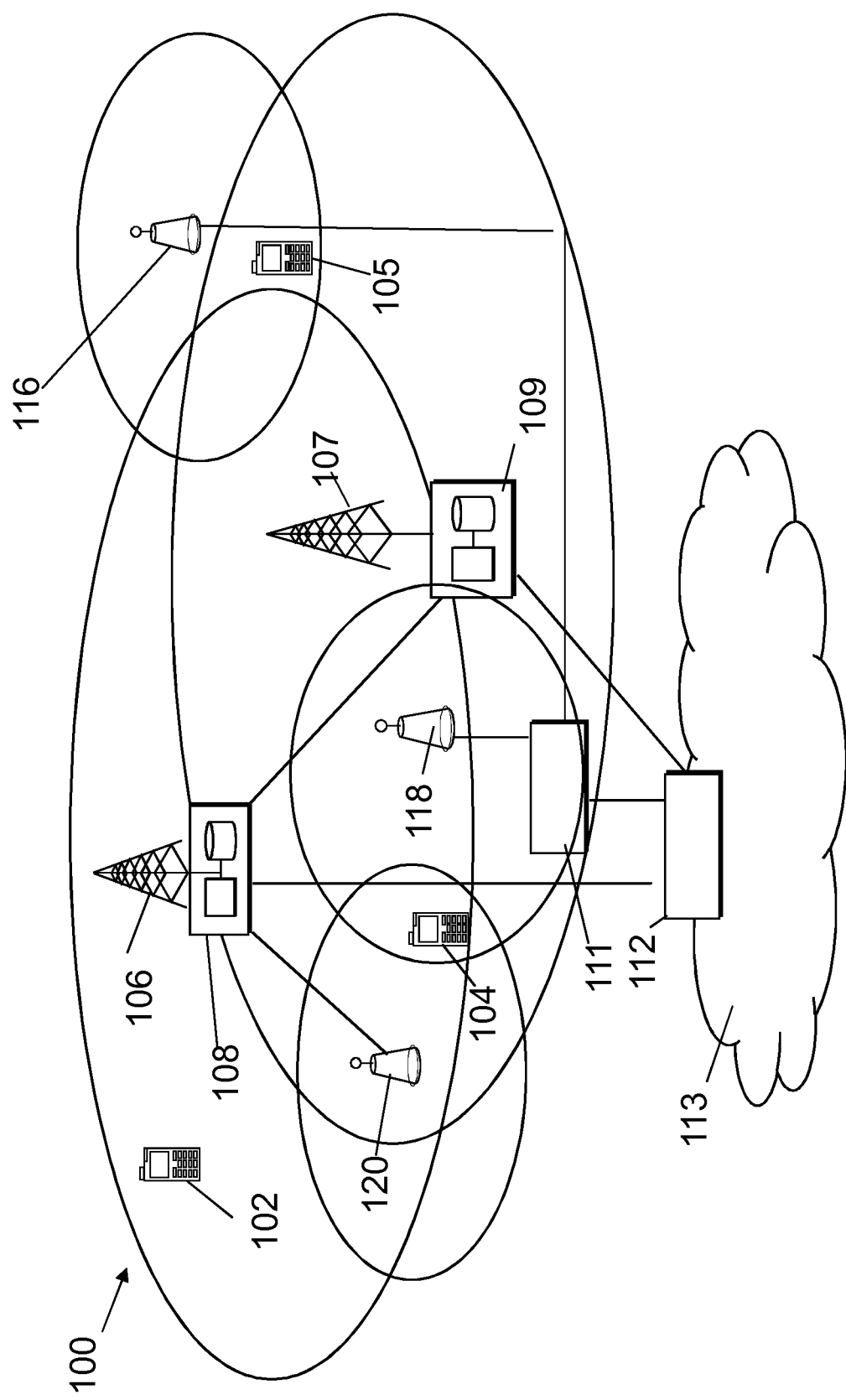
FIG. 1 shows a schematic diagram of an example communication system comprising a base station and a plurality of communication devices.

In a wireless communication system 100, such as that shown in FIG. 1, communication devices (e.g., user equipment (UE)) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a Radio Access Network (RAN) (e.g. wireless communication system 100) or in a core network (CN) (not shown) and may be implemented as one central apparatus or its functionality may be distributed over several apparatuses. The controller apparatus may be part of the base station and/or provided by a separate entity such as a radio network controller. In FIG.

1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst base station 120 connects via the controller apparatus 108. In some embodiments, the smaller base stations may not be provided. Smaller base stations 116, 118 and 120 may be part of a second network, for example WLAN and may be WLAN Access Points (APs).

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). A User Plane Function (UPF) whose role is called PDU Session Anchor (PSA) may be responsible for forwarding frames back and forth between the data network (DN) and the tunnels established over the 5G towards the UE(s) exchanging traffic with the DN.

The UPF is controlled by an Session Management Function (SMF) that receives policies from a Policy Control Function (PCF). The CN may also include an Access & Mobility Function (AMF).

Figure 2:
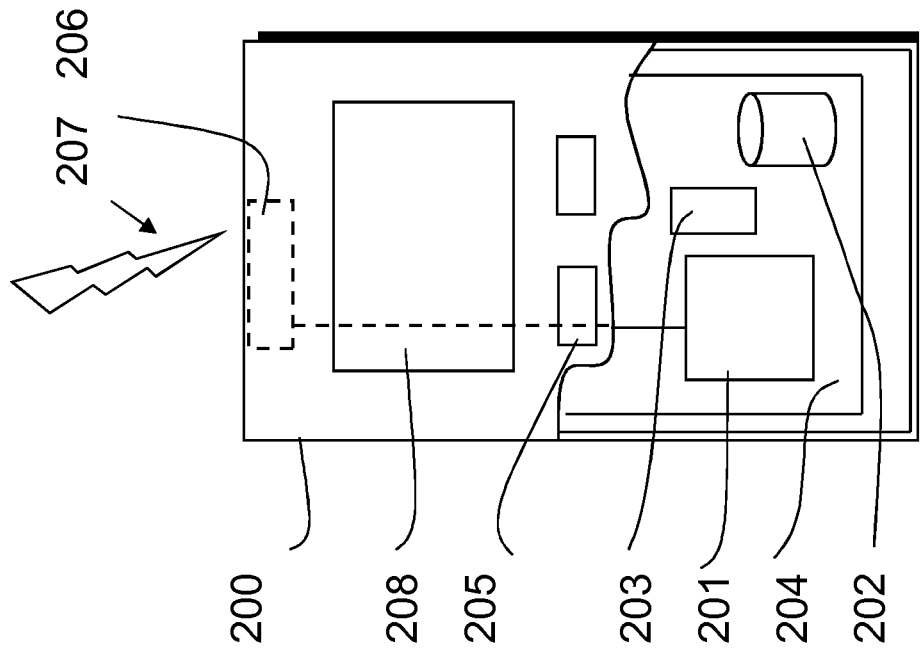
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
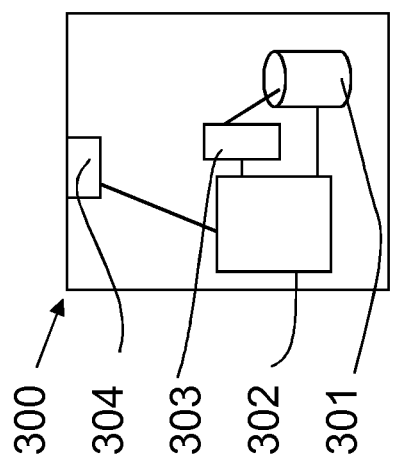
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Cooperative Intelligent Transportation Systems (C-ITS) rely on communication among vehicles, roadside infrastructure, and backend servers to support a variety of road safety and traffic efficiency applications. C-ITS standardization activities are coordinated at the international level by ISO TC 204 and mirrored in regional/national SDOs, such as ETSI TC ITS in Europe, SAE in U.S., RIOH TC 268 in China, and JISC ITS CS in Japan.

C-ITS applications (which may include geoservices, cognitive analytics and traffic management and may be, e.g., Road Hazard Signalling, Intersection Collision Risk Warning and Cooperative Adaptive Cruise Control), rely on C-ITS basic services, which provide generic support facilities to the C-ITS applications, such as context awareness, road and lane topology, traffic light information etc.

Cooperative awareness (CA) is one C-ITS basic service that enables a vehicular or roadside ITS station (V-ITS-S or R-ITS-S) to announce itself to other ITS stations in the vicinity and, thereby, makes ITS stations (and C-ITS applications on those ITS stations) aware of their surroundings. CA is achieved though the transmission of messages that contain information such as, but not limited to, the identity and type of the transmitting ITS station, its geographical location, lane position, speed, acceleration, heading, and other information depending, for example, on the ITS-S type (e.g. car, truck, motorbike) and/or the condition that triggered the message transmission.

In the ETSI standard EN 302 637-2, those messages are called Cooperative Awareness Messages (CAMs), while in the SAE standard J2735 they are called Basic Safety Messages (BSMs). In future amendments of C-ITS standards, new CA message types may be defined to enhance context awareness through, e.g., high-definition sensor sharing (LIDARs, cameras, etc.). In the following, the term "CA message" is used to refer to any existing or future CA message type, while specific implementation examples may refer to standardized CA message types, such as ETSI CAM.

In the near future, all vehicles on the roads and all roadside infrastructure nodes may be mandated by law to transmit and receive CA messages. For example, in April 2019, EU parliament proposed the Delegated Act on deployment and operational use of C-ITS in Europe, which requires all V-ITS-S and R-ITS-S to transmit and receive CAM messages.

Since CA messages are critical for road safety and traffic efficiency application, ITS stations should be able to transmit and receive them without relying on network infrastructure coverage. Therefore, the mentioned regulations propose direct vehicle-to-vehicle (V2V) and vehicle-to-infrastructure (V2I) transmission of CA messages using short-range communication technologies based on IEEE 802.11p standard (i.e. DSRC in U.S., ITS-G5 in Europe) operating in the 5.9 GHz spectrum bands dedicated for road safety and traffic efficiency ITS applications. The regulations may be amended (before or after entering into force) to include other short-range communication based on technologies such as, but not limited to, 3GPP LTE PC5 and 3GPP NR PC5.

The following relates to extending C-ITS cooperative awareness to mobile network operators' (MNO) and/or automotive original equipment manufacturers' (OEM) cloud in a radio resource efficient way. This awareness may be needed in order to deploy C-ITS applications on a remote, edge, or roadside cloud.

Cooperative awareness may be provided at the cloud by configuring ITS stations to duplicate CA messages (whose transmission over a short-range interface will be mandated by legislation) to their long-range (e.g. NR/LTE Uu) interface. Uplink transmissions of CA messages, however, may require significant radio resources: There could be hundreds of ITS stations within a coverage area of a macro cell, each transmitting CA messages at a typical rate of ten messages per second.

3GPP network and applications running on a 3GPP V2X application server (defined by 3GPP in TS 23.286) have no means to control the timing, content, and size of CA messages, since those are defined by the ETSI/SAE/ISO standards and generated by the upper layers of the C-ITS protocol stack.

One alternative to duplicating CA messages generated by the C-ITS stack is to standardize and implement a 3GPP CA service at vehicular UEs, with its own CA message types whose generation and transmission can be fully controlled by the 3GPP network to optimize radio resource usage. In addition to 3GPP willingness to undertake this work, this may require additional legislation to address issues such as security and privacy of those messages. C-ITS stack already implements security and certificate policies required by the law (e.g. by the European certificate policy and security policy), hence duplicated CA messages are already signed by originator's signature. Therefore, the duplication of C-ITS CA messages on Uu interface would only require a new communication system profile (CSP) definition to be added to the proposed legislation. 5G Automotive Association (5G AA) is already working on such profile, called Uu-CSP, aimed at the proposed Delegated Act.

As part of an effort to define Uu-CSP, 5GAA WG4 has surveyed different protocol stack configuration options for the transmission of ITS messages over Uu interface. However, no specific mechanism has been proposed by 5GAA to optimize the uplink radio resource consumption and QoS.

Physical Uplink Shared Channel (PUSCH) may provide ample capacity for the uplink transmission of CA messages multiplexed with the rest of the uplink traffic.

According to the 3GPP Rel-15 medium access control (MAC) specification TS 38.321, uplink transmissions on PUSCH can be scheduled by gNB using dynamic scheduling or using configured grant (CG).

Dynamic scheduling requires that, before a UE attempts an uplink transmission, the UE receives an uplink grant from gNB over Physical Downlink Control Channel (PDCCH). Transmission of many CA messages from hundreds of UEs may require significant PDCCH resources, especially when higher PDCCH aggregation levels must be used due to the poor link budget (e.g. large cells, many cell edge UEs), and in case of beamforming, where UEs in different beams may require PDCCH to be transmitted in different symbols (therefore increasing the number of symbols used for PDCCH). Furthermore, dynamically scheduled UEs need to transmit scheduling requests (SRs) along with buffer status reports (BSRs) to gNB to request uplink grants. SRs require Physical Uplink Control Channel (PUCCH) resources. Optionally, they can be transmitted on PUSCH along with BSRs (so-called PUCCH-less operation). Those BSR/SR transmissions on PUSCH also require uplink grants over PDCCH, hence, additional PDCCH resources.

To reduce L1 signalling overhead, particularly on PDCCH, 3GPP specification includes configured grant (CG) mechanism. However, CG may be suited for predictable traffic pattern e.g. periodic messages of constant size, which is not the case with CA messages that are often kinematically triggered and variable in size.

The configured grant mechanism allows a gNB to configure periodic resources to be used exclusively by a UE (dedicated CG) or by multiple UEs in a contention-based manner (shared CG). CG reduces PDCCH overhead by eliminating the need for explicit uplink grant for every uplink transmission. This comes at the cost of scheduling flexibility: CG is best suited for predictable periodic traffic with constant message size. CA messages do not fall into this category: generation of ETSI CAMs, for example, is triggered by a combination of periodic timers, which may be dynamically adapted by the C-ITS applications, and kinematic triggers (i.e. change in speed or heading of the vehicle). CA messages may also be variable in size.

3GPP Rel-15 provides several tools that may be used to optimize the CG-based UL transmission of CA messages.

The 5G QoS model in TS 23.501 defines QoS rules by which NAS layer at UE may filter CA messages into QoS flows, which are then mapped to and transmitted over data radio bearers (DRBs) and associated logical channels (LCHs) that give CA messages specific treatment over Uu aimed to meet their QoS characteristic.

With a CG, gNB schedules a UE (or a group of UEs in case of shared CG) rather than a particular QoS flow/LCH/DRB. However, LCH prioritization (LCP) procedure allows UE to prioritize or restrict certain LCHs on resources indicated by the CG. There are proposals in the ongoing Rel-16 NR_IIoT WI to enable explicit mapping between a CG and a LCH.

Support for multiple uplink CG with different resource periodicities (up to 8 per UE) has been introduced in 3GPP Rel-14. Therefore, a LCH that contains a QoS flow of CA messages may be mapped to multiple CGs.

SPS assistance information has been introduced in 3GPP Rel-14 to allow UE to report traffic parameters (e.g. preferred SPS interval, timing offset with respect to subframe 0 of the SFN 0, and maximum transport block size) that can be used by eNB to configure SPS resources. Uplink SPS is Rel-14 equivalent of NR CG, therefore we refer to SPS assistance information as "CG assistance information" in the context of NR.

Figure 4:
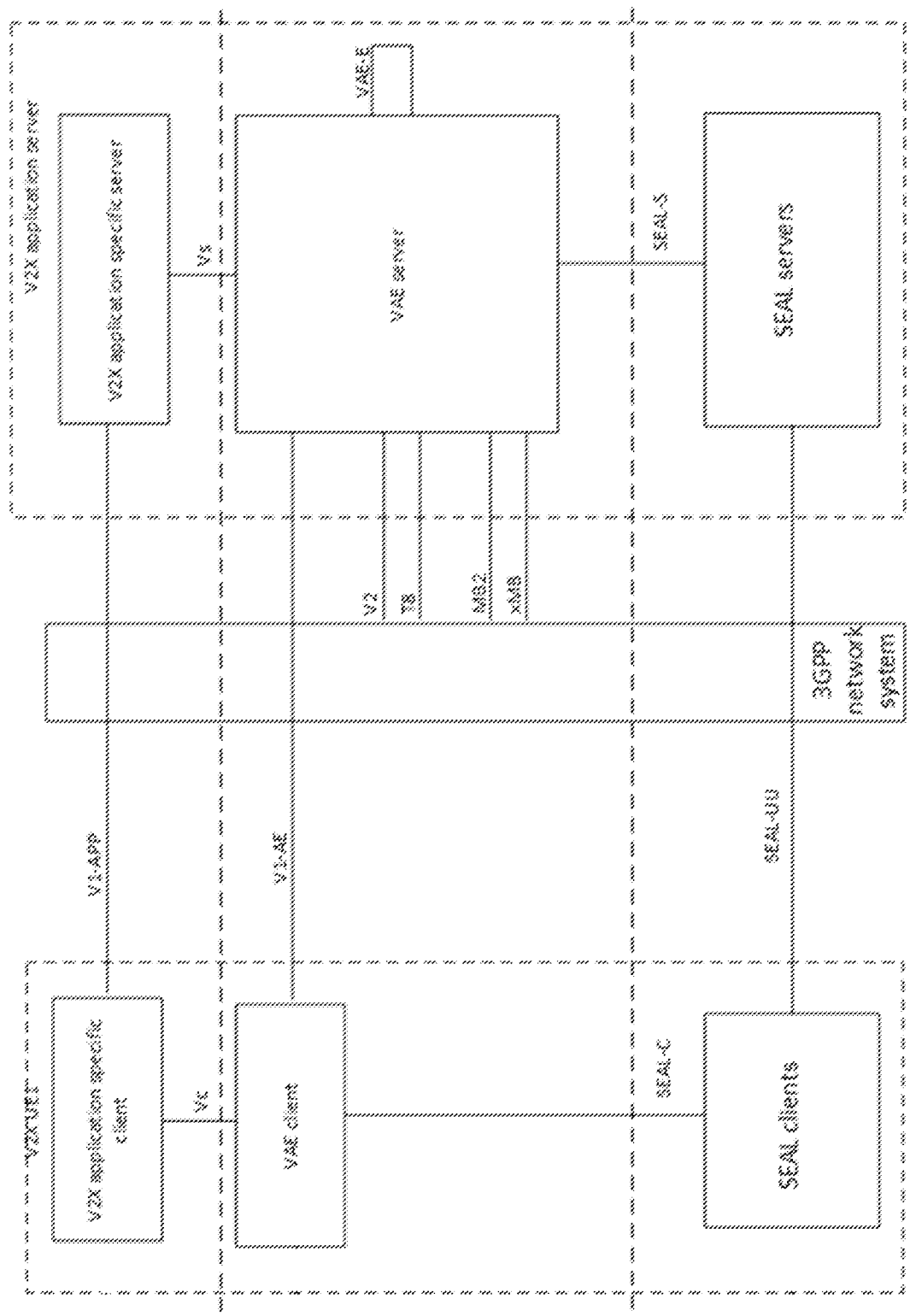
FIG. 4 shows a schematic diagram of an example architecture for a V2X application layer.

The 3GPP SA6 work item "Application layer support for V2X services" (V2XAPP) has specified the 3GPP V2X application layer, whose extensions are studied in the ongoing FS_eV2XAPP study item to take into consideration V2X application standards defined outside 3GPP, such as ETSI and SAE. An example architectural model for the V2X application layer such as that shown in FIG. 4 consists of two sub-layers: V2X application specific layer and the V2X application enabler (VAE) layer. The V2X application layer utilizes the services of the SEAL (Service Enabler Architecture Layer for Verticals) layer specified in 3GPP TS 23.434. On the network side, a V2X Application Server consists of the V2X application specific server, VAE server, and SEAL servers. The V2X Application Server supports V2X UEs connected to 5GS networks of different PLMN operators. On a UE side, V2X Application Client consists of V2X application specific client, VAE client, and SEAL clients.

This method described below follows this functional architecture and extends it with procedures and information flows needed for radio resource efficient CA service provisioning at the cloud based on uplink CA message transmission from the V2X application client to the V2X application server.

Figure 5:
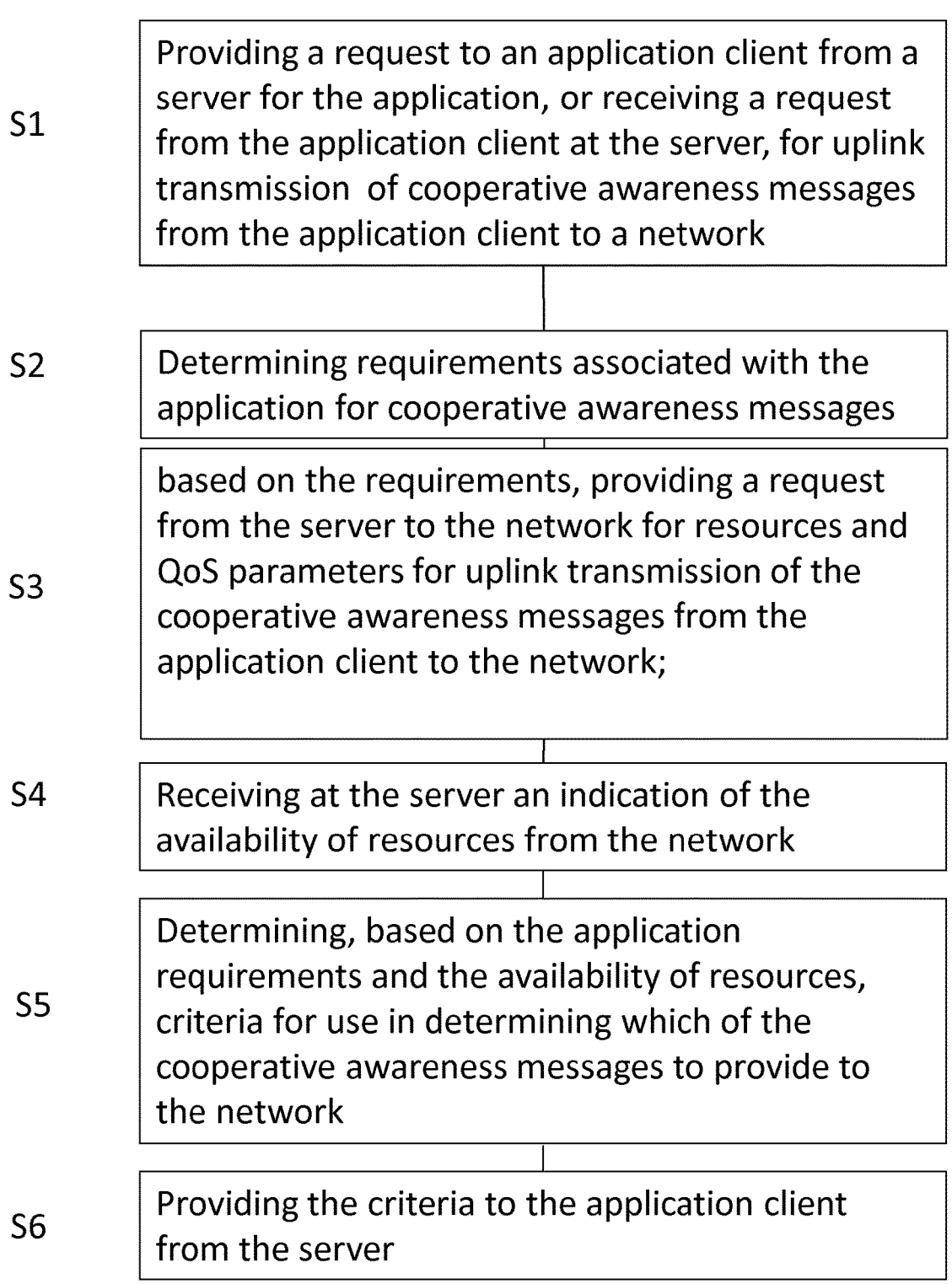
FIG. 5 shows a flowchart of a method according to an example embodiment.

FIG. 5 shows a flowchart of a method according to an example embodiment.

In a first step, S1, the method comprises providing a request to an application client from a server for the application, or receiving a request from the application client at the server, for uplink transmission of CA messages to a network. The application may be a V2X application. The application client may be associated with a user equipment, e.g. a V2X UE. The CA messages may be generated by one or multiple CA services of the C-ITS protocol stack.

CA upload may be triggered by the UE, in which case a CA upload request is transmitted from the V2X application client to the V2X application server or by the V2X application server, in which case a CA_upload_request is transmitted from the V2X application server to the V2X application client.

The CA_upload_request may contain the V2X_service_ID of the CA service whose messages V2X application server wants to receive from a V2X UE. The V2X application server may perform CA service discovery to determine available CA services before the first step. V2X_service_ID is defined in 23.286. V2X_service_ID is a globally unique identifier that represents a V2X service.

In a second step, S2, the method comprises determining requirements associated with the application for cooperative awareness messages.

The requirements may include, but are not limited, at least one of latency and message priority.

In a third step, S3, the method comprises providing a request from the server to the network for resources and QoS parameters for uplink transmission of the cooperative awareness messages from the application client to the network.

In a fourth step, S4, the method comprises receiving an indication of the availability of resources and the QoS parameters at the server from the network.

In a fifth step the method comprises either:
- if the server receives an indication from the network that the requested resources are unavailable, providing an indication to the application client that the network has no available resources for uplink transmission of the cooperative awareness messages from the application client to the network, network, or
- if the server receives an indication from the network that the requested resources are available, determining, S5, based on the application requirements and the availability of resources, criteria for use in determining which of the cooperative awareness messages to provide to the network.

In a sixth step, S6, the method comprises providing the criteria to the application client from the server.

The server may comprise a V2X application server. The V2X application server may comprise at least one V2X application specific server.

Figure 6:
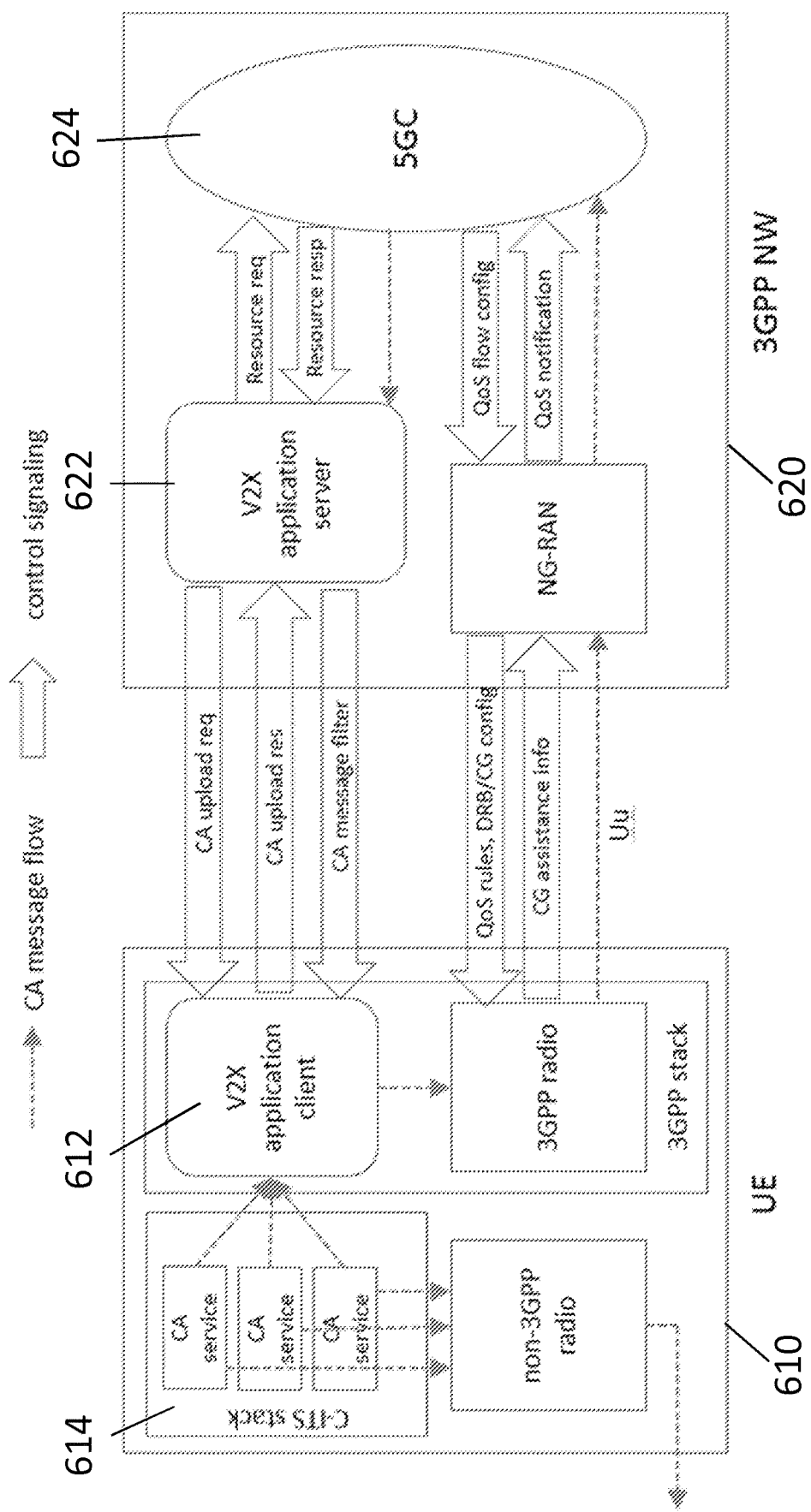
FIG. 6 shows a schematic diagram of a signalling flow according to an example embodiment.

FIG. 6 shows a signalling flow for control signalling and the CA message flow between a V2X application client 612 at a UE 610 and V2X application server 622 at a 3GPP network 620 according to an example embodiment. In the example shown in FIG. 6, the V2X application server 622 sends a CA_upload_request to a V2X application client 612 and receives a CA_upload_response from the application client 612.

The V2X application server 622 sends a resource request to the 5GC 624 and receives a resource response from the 5GC 624. The V2X application server 622 than sends a CA message filter (as described in more detail below) to the V2X application client 612.

The method may comprise receiving a traffic specification at the server from the application client. The traffic specification may be forwarded from the application sever to an application specific server. The traffic specification may be received with the CA_upload response. Including the traffic specification in the CA upload response is optional, e.g., in case traffic generated by CA service is deterministic and well-defined and its characteristics are known to the V2X application server. In the example embodiment shown in FIG. 6, a CA traffic specification may be forwarded from the V2X application client 612 to the V2X application server 622, and then to the relevant V2X application specific server(s) hosted on the V2X application server 622.

A V2X UE 610 issues a CA_upload_response with the optional CA traffic specification (or with a upload refusal if for whatever reason UE cannot support duplication and transmission of CA massages over Uu). The CA traffic specification may contain the following information elements: triggering conditions (condition under which a CA message is generated at UE), CA message size statistics, and CA message interval statistics.

The CA upload request and CA upload response may be provided using V1 (i.e. V1-AE or V1-APP) signaling between V2X application client 612 and V2X application server 622. Internal signaling over Vs reference point may relay the CA traffic specification from the VAE server to the relevant V2X application specific server(s).

Resources for transmission of the cooperative awareness messages from the user equipment may comprise 3GPP network resources and QoS parameters for the uplink transmission of (a subset of) CA messages. The CA messages for which resources are requested may be those deemed relevant by V2X application specific server(s) hosted on the V2X application server 622 (e.g, based on the application requirements).

Requesting 3GPP network resources for QoS flows associated with CA messages may involve internal signaling within a V2X application server 622 (i.e., between V2X application specific server and VAE server over Vs reference point, and between VAE server and Network Resource Management (NRM) server of the SEAL layer over NRM-S reference point).

If there is a positive response to the resource request, QoS flows may be established and QoS rules configured with IP packet filters for the mapping of CA messages to QoS flows at UE The criteria for use in determining which of the cooperative messages to provide to the network may comprise rules for discarding of cooperative awareness message not to be provided to the network. Cooperative awareness messages that are to be provided to the network may be marked with an appropriate IPv4 type-of-service or IPv6 traffic-class markers.

Determining, based on the parameters and the availability of resources, criteria for use in determining which of the cooperative messages to provide to the network may comprise configuration of a CA message filter at the V2X application client based on the V2X application server's prioritization of CA messages and 3GPP network's response to the resource request (including QoS parameters), and any subsequent re-configurations triggered by QoS change notifications from the radio access network. The filter may contain rules for discarding of CA message that are not deemed relevant and IPv4/IPv6 Type of Service/Traffic class marking of CA messages that are deemed relevant by the V2X application server. Each ToS/TC is associated with a 3GPP QoS profile.

Each cooperative awareness message may be associated with protocol control information. The associated protocol control information is for use in determining which of the cooperative awareness messages to provide to the network. In the example shown in FIG. 6, the method may comprise duplication of CA messages in the upper layers of the C-ITS stack 614 and forwarding of the messages to the V2X application client 612 along with the protocol control information (PCI). The duplication may take place in different points of the C-ITS protocol stack 614 (e.g. at the Facilities layer or at the GeoNetworking layer). Associating PCI with duplicated CA messages may facilitate filtering of the messages based on the CA message filter.

The duplicated CA messages in the V2X application client 612 may be filtered based on the CA message filter. The filtered CA messages may be mapped to QoS flows (based on the ToS/TC marking) at the NAS layer. Subsequently, the QoS flows may be mapped to the DRBs/LCHs at the SDAP layer. The filtering functionality may be located outside of the VAE client, e.g. in an entity that resides between VAE client and the Facilities layer of the C-ITS protocol stack 614 where CA messages are generated.

The parameters of CG(s) at gNB may be set up based on CG assistance information received from the UE and subsequent configuration/activation of those CG(s) at UE 610 as shown in FIG. 6.

The method may give the 3GPP network a level of control over the duplicated C-ITS CA information that is transmitted in the uplink to avoid excessive radio resource usage. This control is achieved through message filtering and prioritization, which are configured at the vehicular UE based on 1) the requirements of the C-ITS applications residing on the MNO's/OEM's cloud and 2) the availability of the 3GPP network resources.

The method may enable resource optimized uplink transmission of CA messages from the V2X application client to the V2X application server over the Uu interface.

Figure 7:
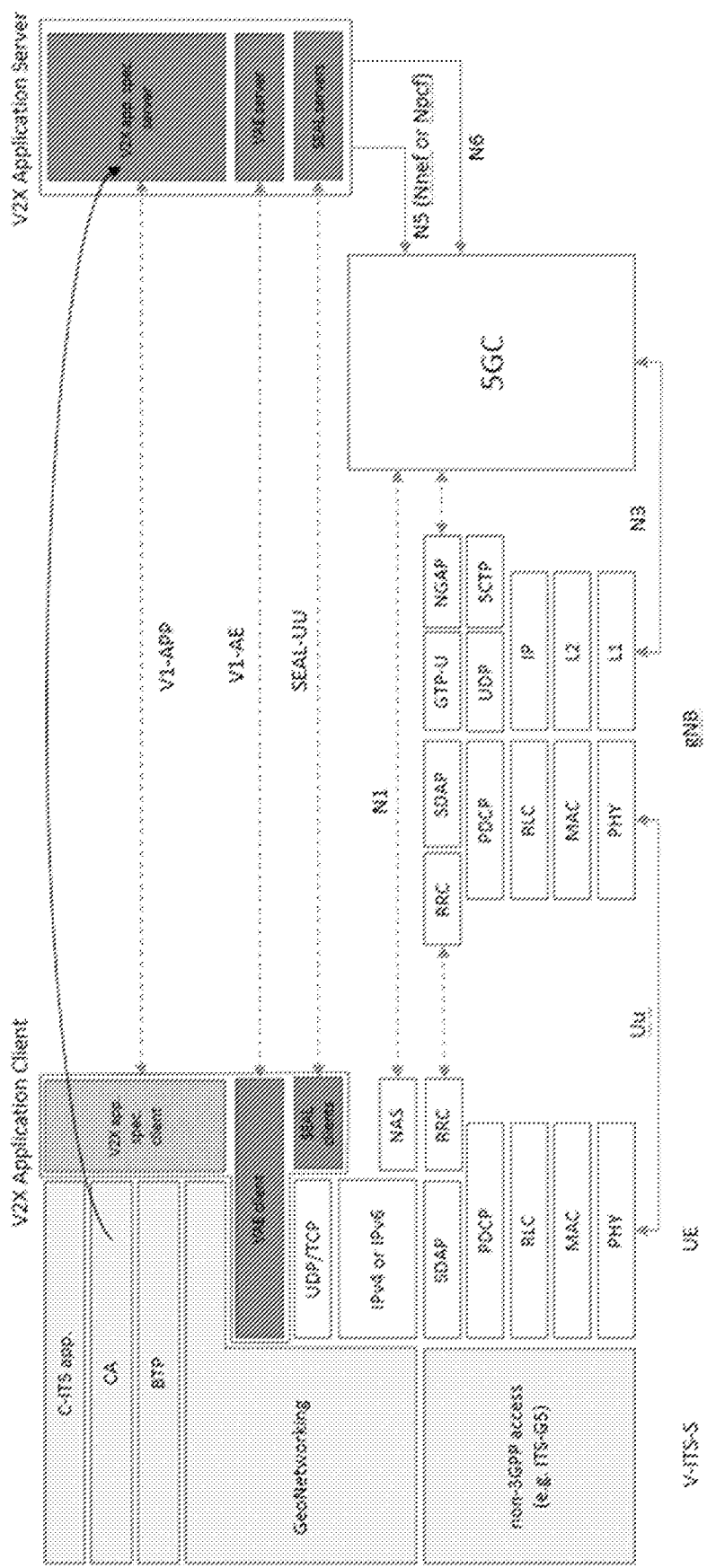
FIG. 7 shows a schematic diagram of an architecture according to an example embodiment.

FIG. 7 shows an architecture including a V2X Application Client and a V2X Application Server used in an example embodiment.

In this example embodiment, a VAE server (or VAE client) requests uplink transmission of CA messages generated by one or multiple CA services of the C-ITS protocol stack (e.g. CAM/BSM, high-definition sensor data sharing).

The VAE client responds with the optional specification of the CA traffic including, e.g., CA message triggering conditions, message size statistics, and message interval statistics.

The response with the optional traffic specification is received by the VAE server and forwarded to relevant V2X application specific server(s) using an extension to the signaling between VAE client and VAE server over the V1-AE reference point and between VAE server and V2X application specific server over the Vs reference point.

The V2X application specific server (which may be, for example, a trajectory prediction service) that is interested in receiving the CA messages from a UE sends a V2XApplicationRequirementRequest to the VAE server indicating its CA requirements e.g. max. latencies and priorities of CA message associated with different CA services and with different triggering conditions associated with the generation of the CA messages. The V2X application specific server may include several alternative sets of CA requirements. The sets of CA requirements may be in a prioritized order. CA requirements may be dependent on the type of the UE (e.g. car, truck, roadside station), its current status (e.g. parked, driving), and location (e.g. city, highway, local road).

The VAE server requests network resources for the uplink CA message transmissions by sending a NetworkResourceAdaptationRequest to the NRM server of the SEAL layer. Network resource management (NRM) server of the SEAL layer performs the establishment and modification of radio bearer (RB) for the transport of the QoS flows that carry CA messages. The NetworkResourceAdaptationRequest indicates Type of Service/Traffic Class and QoS requirements of QoS flows to which CA messages will be mapped based on the ToS/TC field. The request may include several alternative sets of QoS requirements for each ToS/TC, possibly in a prioritized order.

The NRM server then requests a PDU session between V2X application client and V2X application server (e.g. using Nnef_AFsessionWithQoS_Create request to the NEF of 5GC with the corresponding description of CA message flows associated with different ToSs/TCs and one or multiple QoS references, as described in [TS 23.502]). In this request to 5GC, NRM server provides 5GC with all information needed for the creation of PCC rules and subsequent binding of CA messages associated with different ToSs/TsC (defined in a PCC rule by means of the SDF templates) to the QoS flows deemed to transport those messages. This information may include: SDF descriptions based on the CA message filter, minimum guaranteed bitrate, maximum message size, maximum packet latency in 5GS, and recommended ARP (allocation and retention priority) for CA message associated with different ToSs/TCs.

If the NetworkResourceAdaptationRequest request is rejected (e.g. due to insufficient resources), the V2X application specific server may send a V2XApplicationRequirementRequest with a new set of CA requirements to the VAE server and, subsequently, the VAE server may send a new NetworkResourceAdaptationRequest to the NRM server. Such reconfiguration may also be triggered during an active CA message session on Uu by the notification mechanism described in Section 5.7.2.4 of TS 23.501, by which NG-RAN notifies when certain QoS parameters (i.e. GFBR) can no longer (or can again) be guaranteed for a QoS flow. This notification may be reported to the VAE server using monitoring and reporting functionality of SCEF in case of EPC or NWDAF in case of 5GC, as described in TS 23.286 and TS 23.287, respectively.

If the NetworkResourceAdaptationRequest is accepted, one or multiple new data radio bearers (DRBs) and associated logical channels (LCHs) may be established between NG-RAN and UE for the transport of the QoS flows to which CA messages are mapped. VAE server then configures VAE client with the CA message filter.

VAE server creates a CA message filter, based on which duplicate CA messages are either discarded or forwarded to the lower layers for uplink transmission with Type of Service (IPv4) or Traffic Class (IPv6) marking applied. Each ToS/TC is associated with a QoS profile and used for mapping CA messages to QoS flows at NAS layer.

The filter is created and subsequently updated based on V2X application requirements received via V2XApplicationRequirementRequest, knowledge of CA message triggering rules, message statistics, and content/container formats (CA traffic specification), the response to the NetworkResourceAdaptationRequest to the NRM server, and monitoring reports/events from the underlying 3GPP network system regarding network situation (e.g. congestion level) in RAN and core network (e.g. provided by the monitoring and reporting functionality of SCEF in case of EPC or NWDAF in case of 5GC, as described in TS 23.286 and TS 23.287, respectively).

For example, the geolocation service on V2X application server may suppress event-triggered CA messages (i.e. triggered by the change in speed or heading) and prioritize with moderate max. latency requirement timer-triggered CAM messages while a vehicle travelling on a highway. In another example, a geolocations service may prioritize with tight max. latency requirement all CAM messages while a vehicle is travelling in within the limits of a populated area for the purpose of enabling vulnerable road user protection applications.

CA message (e.g. ETSI CAM) generated by one or multiple CA services are duplicated at the upper layers of the C-ITS protocol stack, relevant Protocol Control Information (PCI) for the VAE layer is added and passed along with the duplicate CA message to the VAE client. The PCI may contain e.g. the type of trigger that generated the CA message, status of the timers/counters associated with the service that generated the CA message, max. CA message lifetime, and CA message size.

The VAE client then applies the CA message filter rules, and forwards filtered CA messages to the underlaying transport and network layers (UDP/TCP/IP) with the Protocol Control Information (PCI) for the IP layer. The PCI informs the IP layer about the ToS/TC to which the CA message shall be mapped using appropriate value in the ToS/TC field of the IPv4/IPv6 header.

The NAS layer maps CA messages received from the IP layer to QoS flows based on standard 3GPP QoS procedure i.e. using IP Packet Filter Sets in QoS rules. CA messages marked with different ToS (IPv4) or TC (IPv6) by VAE client can be mapped to different QoS flows using IP Packet Filter Sets. gNB maps those QoS flows to appropriate DRBs/LCHs based on their QoS parameters and signals this mapping to the UE using RRC signaling.

The gNB configures one or multiple CGs at UE in order to schedule QoS flows to which CA messages are mapped on the uplink of the Uu interface. Existing LCH prioritization procedure (possibly enhanced with LCH to CG mapping restrictions) can be used to map DRBs/LCHs that carry QoS flows to those CGs. The periodicity and time/frequency resource size of the CG is determined by the gNB based on CG assistance information provided by the UE. SPS assistance information signaling introduced in 3GPP Rel-14 can be adopted to provide such CG assistance information for NR based on the observed arrival times and sizes of CA messages.

An apparatus may comprise means for providing a request to an application client from a server for the application, or receiving a request from the application client at the server, for uplink transmission of cooperative awareness messages from the application client to a network, determining requirements associated with the application for cooperative awareness messages, based on the requirements, providing a request from the server to the network for resources and QoS parameters for uplink transmission of the cooperative awareness messages from the application client to the network, receiving at the server an indication of the availability of resources from the network, determining, based on the application requirements and the availability of resources, criteria for use in determining which of the cooperative awareness messages to provide to the network and providing the criteria to the application client from the server.

Alternatively, or in addition, an apparatus may comprise means for receiving a request at an application client from a server for the application, or providing a request from the application client to the server, for uplink transmission of cooperative awareness messages from the application client to a network and receiving criteria from the server, determined based on the application requirements and the availability of resources, for use in determining which of the cooperative awareness messages to provide to the network from the application client.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising:
   at least one processor; and
   at least one memory including computer program code, the at least one memory and computer program code being configured, with the at least one processor, to cause the apparatus to perform:
   providing a request to an application client from a server for an application, or receiving a request from the application client at the server, for uplink transmission of cooperative awareness messages from the application client to a network;
   determining requirements associated with the application for cooperative awareness messages;
   based on the requirements, providing a resource request from the server to the network for resources and quality of service, QoS, parameters for uplink transmission of the cooperative awareness messages from the application client to the network;
   receiving at the server an indication of availability of resources from the network;
   determining, based on the requirements associated with the application and the availability of resources, criteria for use in determining which of the cooperative awareness messages to provide to the network,
   wherein the criteria comprise rules for discarding of cooperative awareness messages not to be provided to the network and marking of cooperative awareness messages to be provided to the network by a marker, and
   wherein the criteria further comprise configuration of a message filter at the application client based on prioritization of messages by the server and a response by the network to the resource request, and any subsequent re-configurations triggered by QoS change notifications from a radio access network; and
   providing the criteria to the application client from the server,
   wherein the marker comprises at least one Internet Protocol version 4 type-of-service marker or at least one Internet Protocol version 6 traffic-class marker, the cooperative awareness messages are associated with protocol control information and mapped to one or more QoS flows based on their markers, and the associated protocol control information is configured for use in determining which of the cooperative awareness messages to provide to the network.

2. The apparatus according to claim 1, wherein the at least one memory and computer program code are further configured, with the at least one processor, to cause the apparatus to perform receiving a traffic specification at the server from the application client and forwarding the specification to an application specific server.

3. The apparatus according to claim 1, wherein the requirements associated with the application for cooperative awareness messages comprise one or more of the following: latency and message priority.

4. The apparatus according to claim 1, wherein QoS parameters comprise one or more of the following: latency, throughput, and reliability.

5. An apparatus, comprising:
   at least one processor; and
   at least one memory including computer program code, the at least one memory and computer program code being configured, with the at least one processor to cause the apparatus to perform:
   receiving a request at an application client from a server for an application, or providing a request from the application client to the server, for uplink transmission of cooperative awareness messages from the application client to a network; and
   receiving criteria from the server, determined based on requirements associated with the application and availability of resources, for use in determining which of the cooperative awareness messages to provide to the network from the application client,
   wherein the criteria comprise rules for discarding of cooperative awareness messages not to be provided to the network and marking of cooperative awareness messages to be provided to the network by a marker, and
   wherein the criteria further comprise configuration of a message filter at the application client based on prioritization of messages by the server and a response by the network to a resource request, and any subsequent re-configurations triggered by Quality of Service (QoS) change notifications from a radio access network; and applying the rules at the application client to forward filtered messages to underlying transport and network layers with protocol control information for an Internet Protocol (IP) layer, wherein a Non-Access Stratum (NAS) layer maps messages received from the IP layer to QoS flows using IP packet filter sets in QoS rules, wherein the marker comprises at least one IP version 4 type-of-service marker or at least one IP version 6 traffic-class marker, the cooperative awareness messages are associated with protocol control information and mapped to one or more QoS flows based on their markers, and the associated protocol control information is configured for use in determining which of the cooperative awareness messages to provide to the network.

6. The apparatus according to claim 5, wherein the at least one memory and computer program code are further configured, with the at least one processor, to cause the apparatus to perform providing a traffic specification to the server from the application client.

7. The apparatus according to claim 5, wherein the requirements associated with the application for cooperative awareness messages comprise one or more of the following: latency and message priority.

8. The apparatus according to claim 5, wherein QoS parameters comprise one or more of the following: latency, throughput, and reliability.

9. A method, comprising:
providing a request to an application client from a server for an application, or receiving a request from the application client at the server, for uplink transmission of cooperative awareness messages from the application client to a network;
determining requirements associated with the application for cooperative awareness messages;
based on the requirements, providing a resource request from the server to the network for resources and Quality of Service (QoS) parameters for uplink transmission of the cooperative awareness messages from the application client to the network;
receiving at the server an indication of availability of resources from the network;
determining, based on the requirements and the availability of resources, criteria for use in determining which of the cooperative awareness messages to provide to the network,
wherein the criteria comprise rules for discarding of cooperative awareness messages not to be provided to the network and marking of cooperative awareness messages to be provided to the network by a marker, and
wherein the criteria further comprise configuration of a message filter at the application client based on prioritization of messages by the server and a response by the network to the resource request, and any subsequent re-configurations triggered by QoS change notifications from a radio access network;
providing the criteria to the application client from the server; and
applying the rules at the application client to forward filtered messages to underlying transport and network layers with protocol control information for an Internet Protocol (IP) layer, wherein a Non-Access Stratum (NAS) layer maps messages received from the IP layer to QoS flows using IP packet filter sets in QoS rules.

10. A method, comprising:
receiving a request at an application client from a server for an application, or providing a request from the application client to the server, for uplink transmission of cooperative awareness messages from the application client to a network; and
receiving criteria from the server, determined based on application requirements and availability of resources, for use in determining which of the cooperative awareness messages to provide to the network from the application client,
wherein the criteria comprise rules for discarding of cooperative awareness message not to be provided to the network and marking of cooperative awareness messages to be provided to the network by a marker, and
wherein the criteria further comprise configuration of a message filter at the application client based on prioritization of messages by the server and a response by the network to a resource request, and any subsequent re-configurations triggered by Quality of Service (QoS) change notifications from a radio access network; and
applying the rules at the application client to forward filtered messages to underlying transport and network layers with protocol control information for an Internet Protocol (IP) layer, wherein a Non-Access Stratum (NAS) layer maps messages received from the IP layer to QoS flows using IP packet filter sets in QoS rules.

* * * * *